United States Patent
Busker (10) Patent No.: US 10,072,634 B2
(45) Date of Patent: Sep. 11, 2018

(54) METHOD FOR FEEDING ELECTRICAL POWER INTO AN ELECTRICAL SUPPLY NETWORK

(71) Applicant: Wobben Properties GmbH, Aurich (DE)

(72) Inventor: Kai Busker, Großefehn (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 0 days.

(21) Appl. No.: 14/924,447

(22) Filed: Oct. 27, 2015

(65) Prior Publication Data

US 2016/0131109 A1    May 12, 2016

Related U.S. Application Data

(63) Continuation of application No. PCT/EP2014/059099, filed on May 5, 2014.

(30) Foreign Application Priority Data

May 8, 2013    (DE) .................... 10 2013 208 474

(51) Int. Cl.
*F03D 9/00*    (2016.01)
*F03D 7/04*    (2006.01)
(Continued)

(52) U.S. Cl.
CPC ............. *F03D 7/048* (2013.01); *F03D 9/257* (2017.02); *H02J 3/386* (2013.01); *H02J 3/48* (2013.01);
(Continued)

(58) Field of Classification Search
CPC .......... F03D 7/048; F03D 9/005; H02J 3/386; H02J 3/50
(Continued)

(56) References Cited

U.S. PATENT DOCUMENTS

| | | |
|---|---|---|
| 7,071,579 B2 | 7/2006 | Erdman et al. |
| 8,041,465 B2 * | 10/2011 | Larsen ...................... H02J 3/16 700/287 |

(Continued)

FOREIGN PATENT DOCUMENTS

| | | |
|---|---|---|
| CN | 101291129 A | 10/2008 |
| DE | 10 2007 005852 A1 | 8/2008 |

(Continued)

OTHER PUBLICATIONS

Mohseni et al., "Comparing Technical Connection Requirements for Large Wind Power Plants," Power and Energy Society General Meeting, IEEE, Jul. 24, 2011, 8 pages.
(Continued)

*Primary Examiner* — Julio C. Gonzalez R.
(74) *Attorney, Agent, or Firm* — Kilpatrick Townsend and Stockton (57) ABSTRACT

The invention relates to a method for feeding electrical power into an electrical supply network by means of at least a first and a second wind farm. A first electrical wind farm output is provided by the first wind farm to be fed into the electrical supply network and a second electrical wind farm output is provided by the second wind farm to be fed into the electrical supply network, and a total power output is generated from at least the first and second wind farm output and fed into the electrical supply network, wherein a central control unit for controlling the total power output that is fed in controls the provision of at least the first and second wind farm output.

9 Claims, 3 Drawing Sheets

(51) Int. Cl.
*H02J 3/38* (2006.01)
*H02J 3/48* (2006.01)
*H02J 3/50* (2006.01)
*F03D 9/25* (2016.01)

(52) U.S. Cl.
CPC .............. *H02J 3/50* (2013.01); *Y02E 10/723* (2013.01); *Y02E 10/763* (2013.01)

(58) Field of Classification Search
USPC ...................... 290/44, 55; 700/286, 287, 288
See application file for complete search history.

(56) References Cited

U.S. PATENT DOCUMENTS

| | | | | |
|---|---|---|---|---|
| 8,588,987 | B2* | 11/2013 | Riesberg | F03D 7/0284 290/44 |
| 9,026,258 | B2* | 5/2015 | Stapelfeldt | F03D 7/0284 700/287 |
| 2002/0034166 | A1 | 3/2002 | Barany et al. | |
| 2005/0042098 | A1* | 2/2005 | Wobben | F03D 7/0272 416/132 B |
| 2010/0025994 | A1 | 2/2010 | Cardinal et al. | |
| 2011/0301769 | A1* | 12/2011 | Lovmand | F03D 7/028 700/287 |
| 2012/0101643 | A1* | 4/2012 | Kirchner | F03D 7/0284 700/287 |
| 2012/0139247 | A1 | 6/2012 | Krueger | |
| 2016/0111883 | A1 | 4/2016 | Beekmann et al. | |

FOREIGN PATENT DOCUMENTS

| | | |
|---|---|---|
| DE | 10 2009 037 239 A1 | 2/2011 |
| DE | 10 2013 208 474 A1 | 11/2014 |
| EP | 2 175 540 A2 | 4/2010 |
| JP | 2006-060961 A | 3/2006 |
| JP | 2009-239990 A | 10/2009 |
| JP | 2011-038499 A | 2/2011 |
| JP | 2012-005310 A | 1/2012 |
| RU | 2 305 204 C2 | 11/2006 |
| WO | 2012/056564 A1 | 5/2012 |
| WO | 2012/163359 A1 | 12/2012 |
| WO | 2014/180781 A1 | 11/2014 |

OTHER PUBLICATIONS

English Translation of Russian Federation Decision of Grant dated Apr. 14, 2017, 9 pages.
First Office Action for Chinese Application No. 201480025882.5 dated Jun. 19, 2017 and a Search Report dated Jun. 9, 2017, 12 pages.
Aho, J. et al., "Tutorial of Wind Turbine Control for Supporting Grid Frequency through Active Power Control," *2012 American Control Conference*, Fairmont Queen Elizabeth, Montreal, Canada, 14 pages, Jun. 29, 2012.
Office Action for Canadian Application No. 2,911,333, dated Jul. 11, 2017, 3 pages.
Chilean Patent Office for application No. 3230-2015 dated Feb. 13, 2017, 6 pages.
European Office Action for European Patent Application No. 14 722 642.7-1202, dated Jun. 25, 2018, 7 pages.

* cited by examiner

METHOD FOR FEEDING ELECTRICAL POWER INTO AN ELECTRICAL SUPPLY NETWORK

CROSS-REFERENCES TO RELATED APPLICATIONS

This application is a continuation of International Application No. PCT/EP2014/059099, filed May 5, 2014, which claims priority to German Application No. 10 2013 208 474.9, filed May 8, 2013, the entire contents of both of which are incorporated herein by reference in their entirety for all purposes.

The present invention relates to a method for feeding electrical power into an electrical supply network. In addition, the present invention relates to a wind farm arrangement for feeding electrical power into an electrical supply network.

Figure 1:
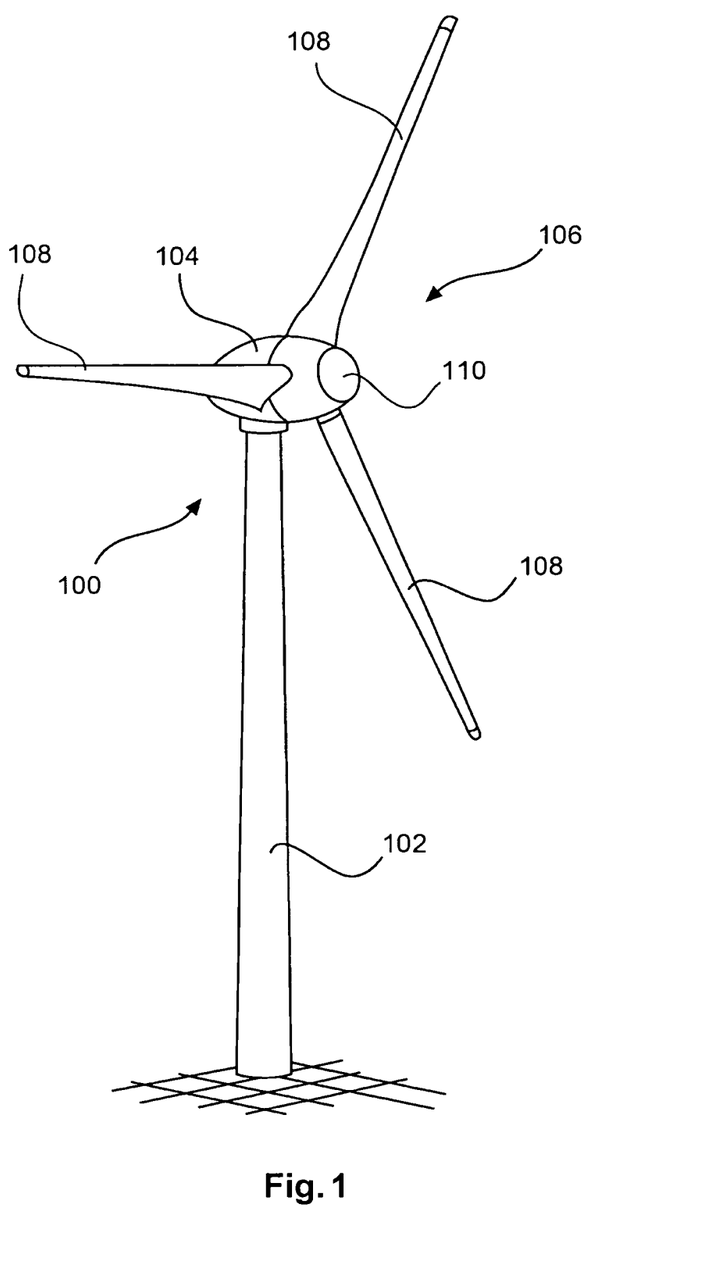
FIG. 1 schematically shows a wind power installation.

It is generally known that wind power installations can generate and feed electrical power into an electrical supply network. A corresponding wind power installation is schematically shown in FIG. 1. Increasingly, instead of operating a single installation, a plurality of wind power installations is installed in a wind farm, which is capable of feeding a correspondingly large amount of power into the supply network. Such a wind farm is shown schematically in FIG. 2 and is characterized in particular by a point of common coupling, by means of which all wind power installations of the wind farm feed into the electrical supply network.

Such wind farms are not only able to feed a large quantity of power into the electrical supply network, but also have a correspondingly large control potential for the stabilization of the electrical supply network. In this regard, for example, the US patent application U.S. Pat. No. 7,638,893 suggests that the operator of the electrical supply network, for example, can provide the wind farm with a power parameter in order to reduce the wind farm output to be fed in, in order to have an additional control option for the supply network thereof.

Depending on the size of the wind farm, such control options may be weak and in addition may be difficult to manage due to the fact that wind power installations and wind farms are decentralized production units, because they are distributed over a comparatively large area of a region in which the respective electrical supply network is operated.

In addition, in many countries such as Germany, efforts are being made to replace conventional large-scale power plants, in particular nuclear power plants, with renewable energy generators such as wind turbines. However, this raises the problem that with the shutting down and removal of a large-scale power plant from the grid, the grid stabilization effect of that plant is also lost. The remaining or newly added power generating units are thus needed in order to at least take into account this change of stability.

The object of the present invention is thus to address at least one of the aforementioned problems and, in particular, to provide a solution for further increasing or improving the support of an electrical supply network by means of wind farms in order to be able to create as stable a supply network as possible. At least one alternative solution should be proposed.

What is proposed in accordance with the invention is therefore a method according to some of the claims. Accordingly, at least two wind farms for feeding electrical power into an electrical supply network are taken as a basis. The first and second wind farms hereby described are representative for two or more wind farms. The teaching is accordingly applicable to a third and additional wind farm. The third or, respectively, each additional wind farm accordingly has the same mechanisms, connections, control options and behavior described for the first and second wind farm.

In this way, at least a first electrical wind farm output is provided by the first wind farm and at least a second electrical wind farm output is provided by the second wind farm and both wind farm outputs are finally to be fed into the supply network. A total power output is generated from these at least two wind farm outputs, namely the total of these two wind farm outputs and, in the case that more than two wind farms are used, the respective wind farm output is added accordingly to this total power output. This total power output is now fed into the electrical supply network.

In addition, a central control unit is proposed, which controls the provision of the first and second wind farm output in order to control the total power output that is fed in. If the total power output is generated by additional wind farm outputs, thus a third and, if applicable, even an additional wind farm output, it is provided accordingly that this central control unit also controls this wind farm output in order to thereby control the total power output, which is to be fed into the electrical supply network.

Thus a central control of a very large quantity of power is thereby proposed, namely of a power that represents the power of at least two wind farms. A control potential can hereby be increased because in essence, from the perspective of the electrical supply network, instead of two or more smaller amounts of power, only one large amount of power is fed into the grid and may also be controlled according to the respective desired requirements.

The proposed method thus reduces the decentralized control that is characteristic of wind power installations, as well as of wind farms. The more wind farms that are jointly controlled in this manner, the individual wind farm outputs thus being fed in together as a total power output and this feeding in being coordinated by the central control unit, the more it will be possible to convert what has previously been a decentralized control into a centralized control.

In particular it is possible to avoid each individual wind farm having its own control, wherein the controls of a plurality of wind farms are difficult to coordinate with one another and, in the worst case scenario, even work against one another.

The risk that two wind farms that feed into the same supply network will work against one another may also arise when both wind farms have implemented the same control to support the supply network. For example, even small measurement inaccuracies may lead to different support behavior or, respectively, control behavior of the two wind farms named in the example. Even minimal time shifts between the two wind farms may be problematic. With even the smallest difference, there may be a risk that the one wind farm already interjects control into the grid before the second wind farm is able to do so.

For example this may mean that such a controlling or, in particular, supporting effect of the first wind farm is already so successful that the second wind farm does not even enter a range in which it can exert a controlling effect. The result in this example is that the control potential of the second wind farm remains unused. In extreme situations the result may be that the second wind farm attempts to cancel the control success of the first wind farm and, as a result, both wind farms actually work against one another. All of this is avoided by means of the proposed method.

Preferably each of these wind farms comprises a wind farm control unit for controlling the respective wind farm.

The central control unit is connected to this wind farm control unit and the central control unit controls the provision of the first and second wind farm output and, where applicable, additional wind farm outputs in turn, by means of the respective wind farm control unit of the respective wind farm. In particular, the central control unit provides each of these wind farm control units with appropriate control commands. In addition, the respective wind farm control units can return needed information to the central control unit. The concrete control of each wind farm can thereby be performed by the individual wind farm control units and the central control unit can control the coordination of the appropriate wind farms among one another by means of default values, which each wind farm then implements accordingly with the help of the wind power installations thereof.

To this end, the central control unit preferably records status variables from the supply network, which are needed for this coordination. The central control unit may also record status variables such as frequency, phase and voltage amplitude for the wind farm, however, and provide these for the needs thereof.

In addition or alternatively, the central control unit records values for the total power output fed in. The central control unit can thus control the total power output that is fed in from the wind farms controlled by said central control unit, such wind farms being referred to as combined wind farms for the sake of simplicity, and can make the necessary controls as appropriate as a function thereof. In addition or alternatively, it is proposed that the central control unit be able to record external default values, and in particular be able to receive such values from the operator of the supply network for example. Thus a default value may be received at a central location and taken into consideration in order to coordinate the combined wind farms based thereon. For example, a maximum quantity of power to be fed in may be specified and compared to the total power output that is fed in. The central control may influence the control of the wind farm as a function of this comparison and, if applicable, may send corresponding control signals to a wind farm or a plurality of wind farms in order to influence the respective wind farm output. The total power output can be influenced thereby and adjusted to the desired value.

According to one embodiment, it is proposed that the method be characterized in that at least the first and second wind farm feed the fed-in power that they are to provide into an intermediate network, wherein in each case, the intermediate network is connected to the respective wind farm by means of a transformer to step up an electrical voltage in the wind farm to a higher electrical voltage in the intermediate network and/or the intermediate network is connected to the electrical supply network by means of a transformer to step up an electrical voltage in the intermediate network to a higher electrical voltage in the supply network.

Thus an intermediate network is proposed, which connects the two wind farms or additional wind farms controlled by means of the method respectively, in essence in order to collect the wind farm outputs on the intermediate network and to also form the total power output here in order to feed that output from the intermediate network to the electrical supply network. A step-up of the wind farm voltages, thus of the voltage of the respective wind farm, may be performed for each wind farm by a transformer. Thus the voltage of each wind farm is stepped up before it is provided to the intermediate network. In addition or alternatively, a transformer is provided in order to step up the voltage in the intermediate network to the voltage in the supply network. It may also be provided that the respective wind farm voltage is stepped up to a higher voltage in the intermediate network and, in addition, that this higher voltage of the intermediate network is further stepped up to an even higher voltage in the supply network. The intermediate network preferably has a medium voltage, specifically in the range of 1 to 50 kV, and the electrical supply network has a high voltage, specifically having a voltage value of approximately 110 kV.

The central control unit preferably records the total power output fed into the supply network in the region or, respectively, at a connection point at which power is fed from the intermediate network into the supply network. This is advantageously implemented in the region of the transformer between the intermediate network and the supply network or there before the transformer.

A further embodiment of the invention proposes that the central control unit controls the feed into the electrical supply network as a function of at least one status variable in the supply network, controls the feed as a function of a grid sensitivity of the supply network with reference to the infeed node, and, in addition or alternatively, that it controls the feed as a function of a short-circuit ratio.

In particular, the grid frequency f, a change in the grid frequency $\partial f/\partial t$, and the line voltage U are used as status variables. In particular, the central control unit ensures that a total power output is fed into the supply network pursuant to a parameter, which may have been defined by the operator of the supply network. Furthermore, namely in addition, a control of the feeding in may be provided as a function of a status variable making it possible to react dynamically to events in the supply network. For example, it may be provided that the total power output that is fed in is reduced when there is an increase in the grid frequency f above a threshold value, which lies above the nominal value. Thus it is proposed that such a dynamic adjustment control be centrally provided for dynamic stabilization or, respectively, the support of the supply network, namely by means of the central control unit. This may be performed in such a way that the central control unit relays appropriate control values or control commands to the wind farm control units. The wind farm control units, in turn, can relay converted values to the individual wind power installations in the appropriate wind farm.

As a result, these two wind farms function as a unit to affect the supply network, which thereby has a very high control potential, namely the power of at least two wind farms. It is thereby possible to avoid the individual wind farms thus connected or even individual wind power installations in the wind farm from working against one another. In addition, this method also simplifies the control for the operator of the supply network, because to this end, said operator only needs to transmit a target value or other desired value to a central control unit. A parameter for a unit having a very large available line is hereby also actuated.

The specified wind farm output and the specified total power output essentially refer to active power. Nonetheless, it is preferably proposed as an alternative that the method features described for this power, thus the active power, in turn be used for a reactive power control. The central control unit can hereby specify a desired reactive power feed for the individual wind farm, in order to thereby be able to realize a desired total reactive power feed, thus the feed in of a total reactive power output. Such a reactive power feed is used in particular as a function of the voltage U of the supply network. According to one embodiment, it is proposed here that the control unit carry out an increasing reactive power feed with a drop in line voltage when the line voltage falls below a threshold value below the nominal voltage, to name only one example.

There is also a large control potential available for such a reactive power control by means of the central control unit because the control potential of all of the combined wind farms, thus at least the two wind farms specified in the example together, is available to the central control unit. Insofar as such a grid state, for example the line voltage specified in the example, is at its nominal value or at least deviates only within a tolerance range thereof, such a reactive power control can provide that no reactive power is fed in.

An additional variable for improving grid support is the observation of the grid sensitivity. Such grid sensitivity can provide information on the current strength or, respectively, stability of the supply network, in particular with reference to the feed point for the total power output. The grid sensitivity may thereby intervene directly in such power control, however it is preferably suggested that a control algorithm be selected, adapted and/or modified as a function of the grid sensitivity, it being possible however for said control algorithm to have other initial parameters. The quality and dynamics of the grid control in particular can hereby be adapted to the current requirements of the supply network, which is referred to simply as the grid.

Grid sensitivity here means the grid's reaction, in particular in relation to the point of common coupling, to a change in a parameter affecting the grid. Grid sensitivity can be defined as the difference of a grid reaction in relation to a difference of a grid influence parameter. What is used here, in particular, is a definition in relation to the fed-in active power and line voltage level. Put in simplified terms, the following formula can be defined, for example, for the grid sensitivity NS:

$$NS = \frac{\Delta U}{\Delta P}$$

Here, $\Delta P$ describes the change in fed-in active power, namely the fed-in total output, and $\Delta U$ describes the resulting change in the line voltage U. These differences are created over a very brief period of time, in particular in the area of one second or less, and advantageously, instead of using this descriptive formula, a partial derivation of the line voltage U, namely in particular the effective value thereof, can be also created based on the fed-in wind farm output P according to the difference of the voltage in relation to the difference of the power. Another possible grid reaction could be the change in grid frequency f. Another way of considering grid sensitivity would be to apply the following formula:

$$NS = \frac{\Delta f}{\Delta P}$$

It is preferably further proposed that a short circuit current ratio be considered and that the infeed be controlled by means of the central control unit as a function of said short circuit current ratio. For that purpose, it is also proposed in particular that a control algorithm be selected, adjusted and/or modified as a function of the short circuit current ratio.

Short circuit ratio (also referred to as SCR) means the ratio of short circuit power to connected load. Short circuit power is the power that the respective supply network can provide at the considered point of common coupling to which the wind power installation, the wind farm or, respectively, the proposed combined wind farms is/are connected, if there is a short circuit at the point of common coupling. The connected load is the connected load of the connected wind power installation, of the connected wind farm or, respectively, the proposed combined wind farms, and thus— in particular—the nominal power of the generator that is to be connected or, respectively, the sum of all nominal powers of the generators of the wind farm or farms. The short circuit ratio is thus a criterion for the strength of the electrical supply network in relation to such considered point of common coupling. A strong electrical supply network relating to said point of common coupling has mostly a large short circuit ratio of, for example, SCR=10 or greater.

It has been recognized that the short circuit ratio can also provide information on the behavior of the respective supply network at the point of common coupling. The short circuit ratio may also vary.

When installing a combined wind farm for the first time, it is advantageous to consider the short circuit ratio and to adapt the active power control and the reactive power control thereto. It is preferably further proposed to record the short circuit ratio on a regular basis even after the installation and commissioning of the combined wind farms. The short circuit power can be recorded, for example, based on information on the grid's topology using simulation. The connected load can be determined simply by having knowledge of the wind power installations installed in the combined wind farms and/or by measuring the unrestricted, total power fed in at nominal wind.

A connected load for the proposed calculation and taking into account of the short-circuit ratio is preferably defined and calculated as the sum of the nominal power of all respective, currently available wind power installations. In this sense, the connected load would already change were one wind power installation to fail, at least on a temporary basis. The short circuit current ratio would thereby also change and this could trigger a change in the active power control and/or the reactive power control.

One embodiment proposes that the central control unit for the feed into the electrical supply network
control the amount of active power to be fed in,
control the amount of reactive power to be fed in, and/or
control the consumption of electrical power in a power consumption device, in particular in a loss resistance device.

The central control unit can thus control the amount of active power to be fed in and, in addition or alternatively, can control the amount of reactive power to be fed in, as described above in conjunction with various embodiments. In addition, the method may stipulate that the consumption of electrical power be controlled in a power consumption device. In particular, the consumption of electrical power in a loss resistance device is considered here. To this end, such a power consumption device may be provided in one, a plurality, or all coordinated wind farms. Such a power consumption device is preferably disposed outside of the wind farms however, which may be referred to simply as farms, and can be directly controlled by the central control unit.

In particular when an intermediate network is provided, the wind farms are coupled to this intermediate network and at least one power consumption device is coupled to this intermediate network. The selective consumption of electrical power may be provided in order to temporarily consume excess power from one, a plurality of, or all coordinated wind farms when, for example, the power to be fed in must be abruptly reduced and the wind power installations of the wind farms cannot reduce the withdrawal of power from the wind quickly enough.

In addition or alternatively, it is proposed that such a power consumption device also specifically create the possibility of removing power from the supply network in the event that an excess should prevail there and the power stations that are feeding this excess in cannot reduce their infeed power quickly enough.

If this at least one power consumption device is directly connected to the intermediate network, it may nevertheless be available to the wind farms. In addition, it can absorb excess power from the supply network without influencing the wind farms.

A device is suggested as a power consumption device, which preferably utilizes the power that is to be consumed as usefully as possible. The device may perform work or, in particular, may provide interim storage for the excess power and in addition, if applicable, may convert said energy into another form of energy for better storage. This power consumption device is preferably also a bi-directional power converter and/or an energy accumulator.

A preferred embodiment proposes that
the central control unit record current status variables in the electrical supply network, in particular frequency and voltage amplitude, and that the unit control at least the provision of the first and second wind farm output as a function thereof and/or
each wind farm control unit provides information concerning at least one status variable for the respective wind farm and the information contains at least
the currently available power,
the power expected to be available within a predetermined forecast period and
changes expected in the available power.

The central control unit is thus also used as a measuring unit, in particular in order to record the frequency amplitude and voltage amplitude of the voltage in the supply network. These variables can be used to control the provision of the first and second and, if applicable, additional wind farm output as a function thereof. The change in voltage $\partial f/\partial t$ described in conjunction with an embodiment can also be determined from this detected frequency of the voltage of the supply network. This information may also be provided for use by the coordinated wind farms, in particular the wind farm control units thereof.

In addition or alternatively, each wind farm control unit provides the central control unit with information regarding the current state of the wind farm, thus with status variables for the respective wind farm, in particular namely the currently available power, the power expected to be available shortly, and expected changes in the available power. The central control unit can evaluate this information concerning the power accordingly and, in light of such information, can merge all coordinated wind farms accordingly. Information regarding the expected power and expected changes in the power can be determined in the respective wind farm, in particular by means of wind forecasts. In one case, this may be a meteorological evaluation. In other cases, especially when the wind farm is spread out over a comparatively large area, the increase or decrease in the wind may be detected at some windward wind power installations. The wind farm, which controls and monitors all of these wind power installations, can derive a forecast therefrom for the wind power installations located behind those that are windward and a power forecast can be derived therefrom and provided to the central control unit in a timely manner. If applicable, the central control unit can relay the appropriate information on to the operator of the supply network based on that information or other information.

The central control unit is preferably prepared to function as a phase shifter. The central control unit hereby takes power from the supply network and feeds that power into the electrical supply network as an infeed current with a phase angle, which is modified or, respectively, adjusted as desired. Such a central control unit can perform this function even when the wind farms are providing no power, for example when there is a dead calm. However the central control unit is preferably prepared to perform such a phase shift operation concurrent to the infeed of the total power output. The possibility for grid support can be increased by this combined operation by the central control unit.

Power is preferably fed into the grid in such a way that disturbances in the supply network are entirely or partially compensated for. To this end, the central control unit detects disturbances, for example such as harmonics, and feeds power in as compensation. In this case, current that is not ideal, which is to say non-sinusoidal current, is specifically fed in, which current deviates from the ideal sinusoidal characteristic in such a way that these deviations, which themselves essentially represent disturbances, compensate as much as possible for, or at least reduce the disturbances in the grid.

In addition, a wind farm arrangement pursuant to some of the claims is proposed. This arrangement is prepared for feeding electrical power into an electrical supply network and comprises at least a first and a second wind farm, each comprising a plurality of wind power installations. Furthermore, the arrangement comprises an intermediate electrical grid that is connected to the wind farms to pass on electrical wind farm output, which is provided by the respective wind farm. The wind farms are thus prepared to feed into this intermediate network. Further, this wind farm arrangement comprises a central control unit, which controls the infeed of a total power output. This total power output merges the wind farm outputs that were fed into the intermediate network or that were provided by means of the intermediate network, and the central control unit is prepared to control these provided wind farm outputs. In particular, the central control unit is linked with the individual wind farms, in particular with a wind farm control unit for each park, by means of a data connection. This connection may be wired or wireless.

In particular, it is provided that the wind farm arrangement be designed to carry out at least one process in accordance with one of the embodiments described above.

To this end, appropriate control functions, in particular control programs, must be implemented in the central control unit and corresponding communication channels are needed between the central control unit and the wind farm control units. Depending on the embodiment of the method to be used, additional elements, in particular sensors and/or a frequency inverter and/or a phase shifting device, may be provided.

In addition, it is proposed that the intermediate network be connected to each of the wind farms by means of a transformer, in order to step up an electrical voltage in the wind farm to a higher electrical voltage in the intermediate network, and in addition or alternatively, that it be provided that the intermediate network be connected to the electrical supply network by means of a transformer, in order to step up an electrical voltage in the intermediate network to a higher electrical voltage in the supply network. Thus it is proposed that a wind power installation arrangement can perform such a step up in the voltage between the wind farm and the intermediate network and/or between the intermediate network and the supply network, as described in conjunction with some embodiments of the proposed method.

It is preferably proposed both for the wind farm arrangement and for the method to be used for the infeed that a desired voltage target value be provided to the central control unit as a reference value for the voltage of the supply network externally, in particular by an operator of the supply network. In addition or alternatively, it is proposed that a maximum power value and/or a desired power value be set for the central control unit. In addition, it is also proposed as an embodiment that a desired reserve power be sent to the central control unit as a default value. Such a reserve power is the power at which the total power output that is fed in lies below the current possible total power output that may be fed in. To this end, a percentage or an absolute specification for the reserve power, for example, can be passed to the central control unit.

The central control unit preferably transmits to the wind farm control units a value for a reactive power that is to be fed in as a reactive power target value, an upper limit for the active power as a power value that the respective wind farm must currently not exceed, and in addition or alternatively, it is proposed that the central control unit transmit a power reserve, which is also referred to as a reserve capacity, to the wind farm control unit as a target value. The individual wind farms and thus, overall, the total power output can thus be operated below a current possible power value. This reserve capacity is thus available as a potential positive operating reserve, thus as power that can be fed in, in addition, as needed.

According to an additional embodiment, it is proposed that each wind farm control unit and/or each wind power installation of the wind farm can each independently provide a grid-state dependent control, in particular a frequency-dependent power control, namely if the central control unit or, respectively, a corresponding wind farm control unit fails. Insofar as in this case only information-processing elements have failed, however the physical connection to the supply network continues to be available, infeed can be continued and a dynamic grid support or, respectively, grid stabilization may even be performed.

Thus many embodiments both of a method and for a wind farm arrangement have been described based on the present invention, which embodiments provide, inter alia, the option that a plurality of wind farms can feed power into the electrical supply network in a coordinated manner and can thereby function in the manner of a large-scale power plant in terms of grid behavior. Purely as a precaution, it should be noted that a central control can develop a beneficial effect, namely such as described above, however, when a plurality of feed points for the infeed of power are physically provided in the electrical supply network, however as long as the infeed is centrally, and, in particular, consistently controlled. Preferably, however, the entire total power output is fed into a point of common coupling in the electrical supply network.

The invention is now described in more detail below using embodiments as examples with reference to the accompanying figures.

FIG. 1 shows a wind power installation 100 having a tower 102 and a nacelle 104. A rotor 106 with three rotor blades 108 and a spinner 110 is arranged on the nacelle 104. When in operation, the rotor 106 is brought to a rotating movement by the wind and thereby drives a generator in the nacelle 104.

Figure 2:
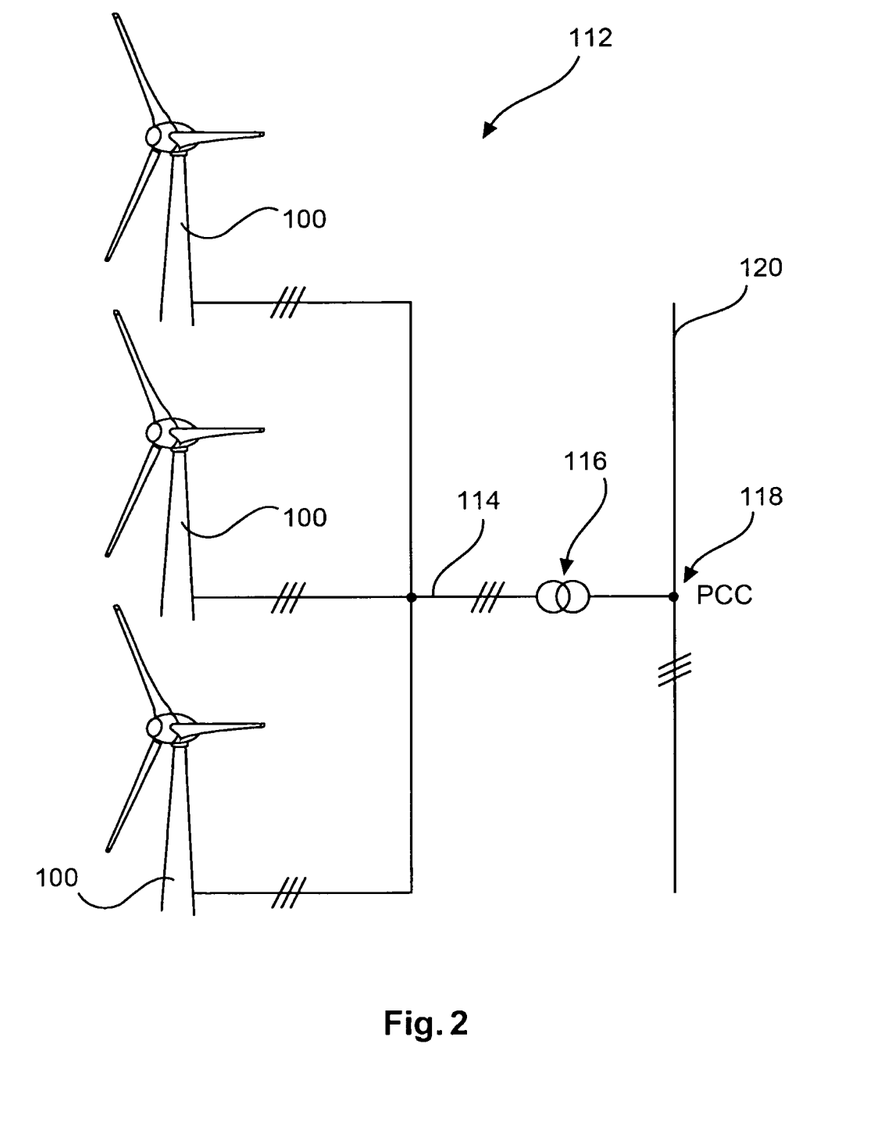
FIG. 2 schematically shows a wind farm.

FIG. 2 shows a wind farm 112 with, for example, three wind power installations 100, which may be the same or differ. The three wind power installations 100 are thus representative of a basically random number of wind power installations of a wind farm 112. The wind power installations 100 provide their power, in particular the generated electricity, via an electrical wind farm grid 114. The currents or, respectively, powers generated by the individual wind power installations 100 are added up. Most often, a transformer 116 will be provided, which transports the voltage at the wind farm to then feed it into the supply network 120 at the feeding point 118, which is also generally referred to as a PCC. FIG. 2 is merely a simplified illustration of a wind farm 112, which does not show, for example, a control, although a control exists, of course. Also, the wind farm grid 114 may be designed differently, including, for example, a transformer at the output of each wind power installation 100, to mention just one other embodiment.

Figure 3:
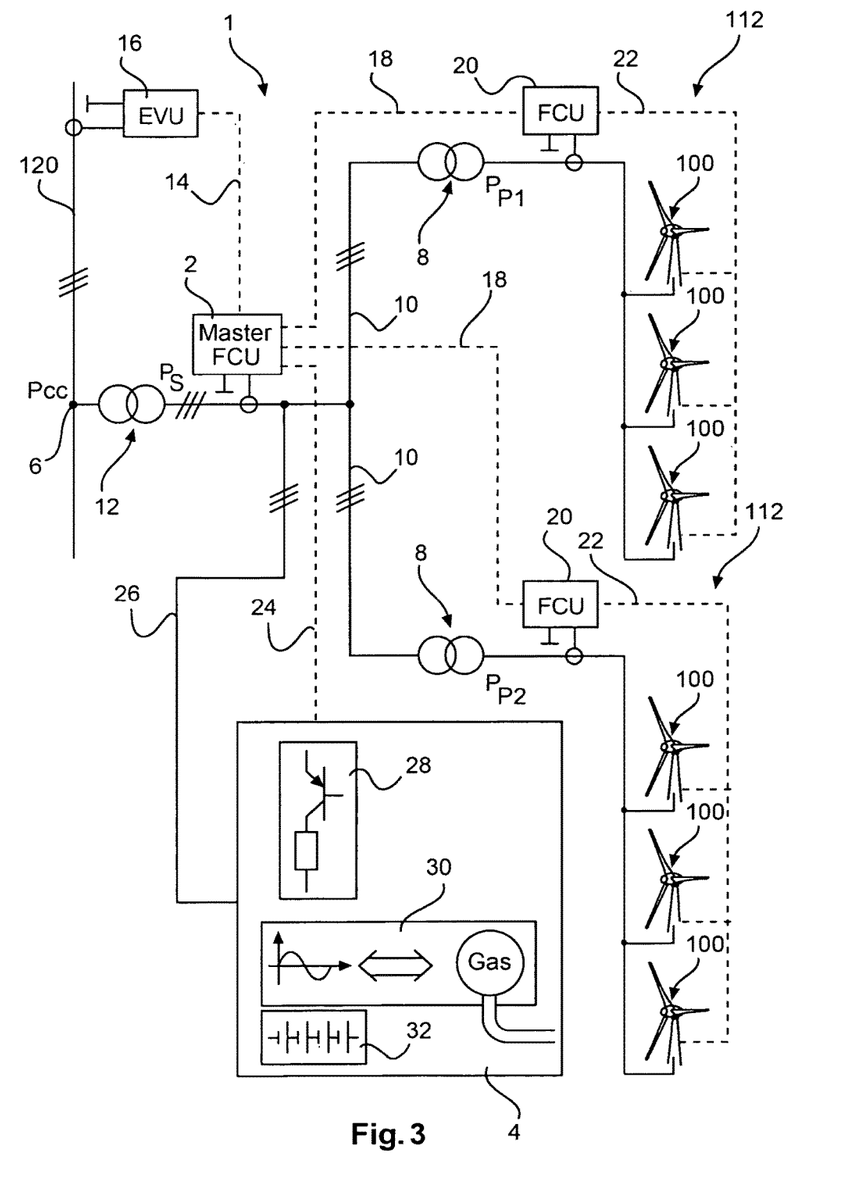
FIG. 3 schematically shows a wind farm arrangement.

FIG. 3 shows a wind farm arrangement 1 having two wind farms 112 by way of example, which may also have a different design, a central control unit 2 and a power consumption device 4. The wind farm arrangement 1 is thereby connected to the electrical supply network 120 at the point of common coupling 6, which supply network is merely indicated here.

FIG. 3 shows two wind farms 112 as an example, which have a plurality of wind power installations 100, for the wind farm arrangement 1. The wind power installations 100 of each wind farm 112 each generate a wind farm output $P_{P1}$ or, respectively, $P_{P2}$ that is provided to an intermediate network 10 by means of a wind farm transformer 8 and which are available to feed into the supply network 120 as a total power output $P_S$. Assuming initially that the power consumption device 4 is not active, the total power output $P_S$ is the total of the wind farm output $P_{P1}$ and $P_{P2}$ and thus satisfies the equation $P_S = P_{P1} + P_{P2}$.

This total power output $P_S$ is fed into the supply network 120 accordingly at the grid connection point 6 by means of the feed transformer 12.

Here, the central control unit is disposed in the region of the grid connection point 6 upstream from the feed transformer 12. There, the central control unit can also record the power $P_S$ that is fed in.

The central control unit 2 is thereby connected to a control unit 16 of the operator of the electrical supply network 120 by means of a power supply company (PSC) data connection 14. The central control unit 2 can receive data from the control unit 16 of the grid operator, for example such as a value for the total power output $P_S$ to be fed in, by means of the PSC data connection 14, and can transfer data, for example such as information concerning the currently available total power output $P_S$. In general, all of the data connections in FIG. 3 are illustrated as a dashed line.

The central control unit is connected to each wind farm control unit 20 of the respective wind farm 112 by means of a wind farm control connection 18. The central control unit 2 can transmit data to the respective wind farm control unit 20 by means of these wind farm control connections 18, in particular target values for the wind farm output, $P_{P1}$ or, respectively, $P_{P2}$, that is to be fed in. It should be noted that the reference signs of both wind farms 112, with the exception of the wind farm output $P_{P1}$ or, respectively, $P_{P2}$, are identical in order to clarify the analogies between the two wind farms. The individual elements such as the wind farm transformer 8 may be configured differently, however.

Other types of communication may be undertaken between the central control unit 2 and the respective wind farm control unit 20 by means of the wind farm control connection 18. In so doing, for example, the wind farm control unit 20 may provide the central control unit 2 with information concerning the currently available wind farm output.

Each wind farm control unit 20 is, in turn, connected within its own wind farm 112 by means of a wind farm data network 22 for the exchange of data with the respective wind power installations 100. The wind farm control unit 20 may thereby relay the respective default values that it has received from the central control unit 2 to the wind power installations 100 in order to control the wind farm 112. In addition, the wind farm control unit 20 may receive information regarding this from the wind power installations 100 and, if applicable, may evaluate this information and if desired may relay that information to the central control unit 2.

Thus, the central control unit 2 can control the infeed of the total power output $P_S$ in that said central control unit controls the individual wind farm outputs $P_{P1}$ and $P_{P2}$ by means of controlling the wind farm control units 20.

In addition, the power consumption device 4 is connected to the power consumption device 4 by means of a consumption control connection 24. The central control unit can in particular exert control hereby when excess power is to be consumed by means of the power consumption device 4. This may be excess power from the wind farms 112, or also excess power from the supply network 120. To this end, the power consumption device 4 is connected to the intermediate network 10 by means of the power consumption connection 26. The power consumption connection 26 may also form a part of the intermediate network 10.

The power consumption device 4 is labeled here with different symbols for different embodiments. A chopper circuit 28 thereby symbolizes a pure power consumption unit, which converts electrical power or, respectively, electrical energy into heat, which can be done using appropriately controlled thermal resistances.

In addition, a conversion means 30 is symbolized, which can convert the electrical power into another medium such as a gas, for example. This conversion means 30 is preferably designed in such a way that the energy from this other medium, for example gas as mentioned in this example, can also be converted back into electrical energy, at least in part. In this case, the result of such a re-conversion would be that the power consumption device 4 could also provide power to the intermediate network 10 and to this extent, in addition to the wind farm outputs $P_{P1}$ and $P_{P2}$, the total power output $P_S$ would also have a returned power consumption.

Finally, an accumulator in the form of a battery storage 32 is also symbolized in the power consumption device 4, which is able to directly store electrical energy.

FIG. 3 thus illustrates a wind farm arrangement, which is prepared to implement a method according to the invention for the infeed of electrical power pursuant to at least one of the described embodiments.

The invention claimed is:

1. A method for feeding electrical power into an electrical supply network by means of at least a first wind farm and a second wind farm, comprising the steps:
   Provision of a first electrical wind farm output by the first wind farm for feeding into the electrical supply network,
   Provision of a second electrical wind farm output by the second wind farm for feeding into the electrical supply network,
   Generation of a total power output from at least the first electrical wind farm output and the second electrical wind farm output and feeding in of the total power output into the electrical supply network,
   wherein:
   a central control unit for controlling the total power fed in controls the provision of at least the first electrical wind farm output and the second electrical wind farm output,
   the first electrical wind farm output and the second electrical wind farm output and the total power output are active power,
   at least the first wind farm and the second wind farm each comprise a wind farm control unit for controlling the respective wind farm,
   the central control unit is connected to the respective wind farm control units of the first wind farm and the second wind farm,
   the central control unit controls the provision of the first electrical wind farm output and the second electrical wind farm output by means of the respective wind farm control unit of at least the first wind farm and the second wind farm,
   the central control unit records status variables for the electrical supply network, values for the total power output fed in, and/or external default values, and
   the central control unit controls the feed into the electrical supply network at least as a function of a grid sensitivity of the electrical supply network with reference to a feed point or as a function of a short-circuit ratio, wherein the grid sensitivity and the short circuit ratio indicate the stability of the electrical supply network.

2. The method according to
claim 1, wherein
at least the first wind farm and the second wind farm feed the power thereof to be fed in for provision into an intermediate network, wherein:
   in each case, the intermediate network is connected to the respective wind farm by means of a transformer to step up an electrical voltage in the wind farm to a higher electrical voltage in the intermediate network and/or
   the intermediate network is connected to the electrical supply network by means of a transformer to step up an electrical voltage in the intermediate network to a higher electrical voltage in the electrical supply network.

3. Method according to
claim 1, wherein
the central control unit controls the feed into the electrical supply network as a function of at least one status variable in the electrical supply network.

4. Method according to
claim 1, wherein
the central control unit for the feed into the electrical supply network controls
   the amount of active power to be fed in,
   the amount of reactive power to be fed in, and/or the consumption of electrical power in a power consumption device, in particular in a loss resistance device.

5. The method according to claim 1, wherein
the central control unit records current status variables in the electrical supply network, in particular frequency and voltage amplitude, and, as a function thereof, controls the provision of at least the first electrical wind farm output and the second electrical wind farm output and/or each wind farm control unit provides information concerning at least one status variable for the respective wind farm and the information contains at least one piece of information from the list comprising:
the currently available power,
the power expected to be available within a predetermined forecast period and
changes expected in the available power.

6. The method according to claim 1, wherein
the central control unit functions as a phase shifter and/or
power is fed into the electrical supply network in such a way that disturbances in the electrical supply network are entirely or partially compensated for.

7. Wind farm arrangement for feeding electrical power into an electrical supply network comprising:
at least a first wind farm and a second wind farm in each case comprising a plurality of wind energy installations,
an intermediate network that is connected to the wind farms, which intermediate network transmits electrical wind farm output provided by the connected wind farms, and
a central control unit for feeding in a total power output that is at least partially generated from the wind farm outputs and for controlling the individual wind farm outputs provided by the connected wind farms, wherein the wind farm outputs and the total power output are active power,
wherein:
at least the first wind farm and second wind farm each comprise a wind farm control unit for controlling the respective wind farm,
the central control unit is connected to the respective wind farm control units of the first wind farm and the second wind farm,
the central control unit controls the provision of the first wind farm output and the second wind farm output by means of the respective wind farm control unit of at least the first wind farm and the second wind farm,
the central control unit records status variables for the electrical supply network, values for the total power output fed in, and/or external default values, and
the central control unit controls the feed into the electrical supply network at least as a function of a grid sensitivity of the electrical supply network with reference to a feed point or as a function of a short-circuit ratio, wherein the grid sensitivity and the short circuit ratio indicate the stability of the electrical supply network.

8. The wind farm arrangement according to claim 7, wherein
in each case, the intermediate network is connected to the respective wind farm by means of a transformer to step up an electrical voltage in the wind farm to a higher electrical voltage in the intermediate network and/or
the intermediate network is connected to the electrical supply network by means of a transformer to step up an electrical voltage in the intermediate network to a higher electrical voltage in the electrical supply network.

9. Wind farm arrangement for feeding electrical power into an electrical supply network comprising:
at least a first wind farm and a second wind farm in each case comprising a plurality of wind energy installations,
an intermediate network that is connected to the wind farms, which intermediate network transmits electrical wind farm output provided by the connected wind farms, and
a central control unit for feeding in a total power output that is at least partially generated from the wind farm outputs and for controlling the individual wind farm outputs provided by the connected wind farms, wherein the wind farm arrangement uses a method according to claim 1.

* * * * *